Nov. 28, 1961  V. D. POLHEMUS  3,010,504
TIRE CONSTRUCTION

Filed June 6, 1960  2 Sheets-Sheet 1

INVENTOR.
Von D. Polhemus
BY
His Attorney

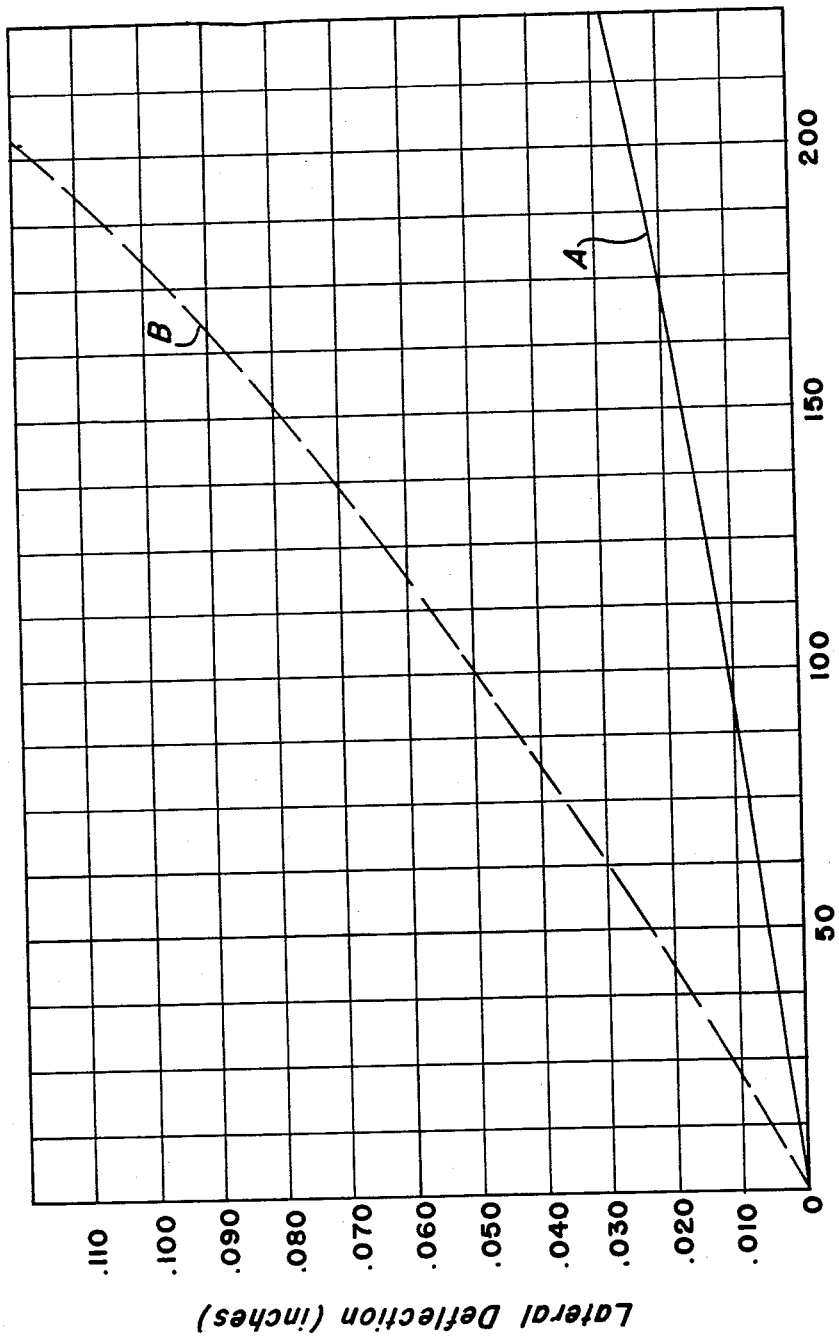

United States Patent Office 3,010,504
Patented Nov. 28, 1961

3,010,504
TIRE CONSTRUCTION
Von D. Polhemus, Franklin, Mich., assignor to General Motors Corporation, Detroit, Mich., a corporation of Delaware
Filed June 6, 1960, Ser. No. 34,031
6 Claims. (Cl. 152—354)

This invention relates to pneumatic tires and is particularly concerned with pneumatic tires for vehicles and the like which have improved stability.

An object of the invention is to provide a pneumatic tire for a vehicle wherein the tire is internally braced to improve lateral stability thereof whereby the tire may be used at lower operating pressures without loss of stability or high speed durability.

A further object of the invention is to provide a pneumatic tire which reduces side sway in an automotive vehicle when the vehicle is subjected to side loads imposed when going around a curve at high rates of speed for example.

A still further object of the invention is to provide a pneumatic tire which includes a plurality of criss-cross braces formed from cords or wires or other suitable means and which are fastened adjacent the beads of the tire and extend on angles therefrom to opposite sides to the tread portion where they are held in position by, for example, interlacing them between plies of the tread section of the tire.

A still further object of the invention is to decrease circumferential standing waves, especially at high speeds and thereby decrease the temperatures attained by the tires during use as well as reducing noise.

Further objects and advantages of the present invention will be apparent from the following description, reference being had to the accompanying drawings wherein preferred embodiments of the present invention are clearly shown.

Figure 1:
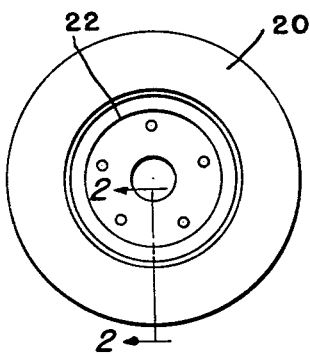
Figure 3:
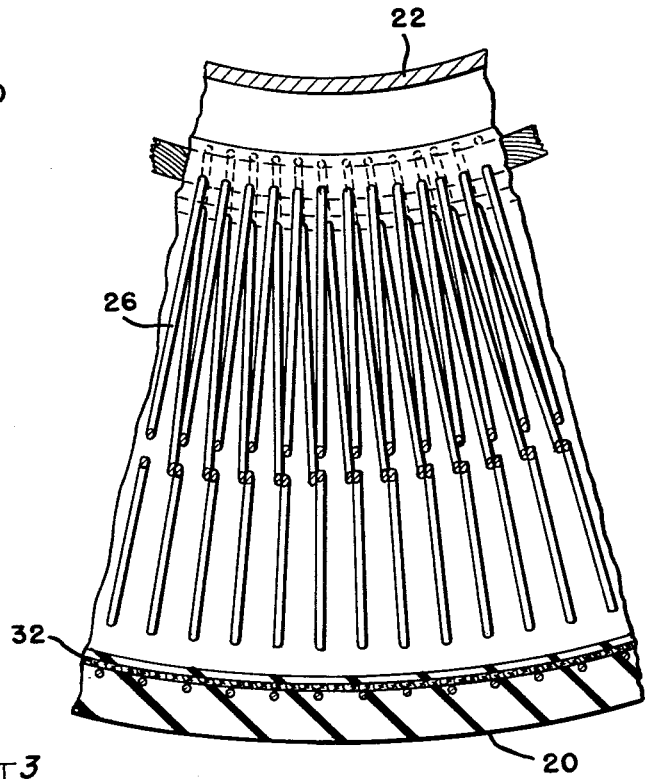
Figure 2:
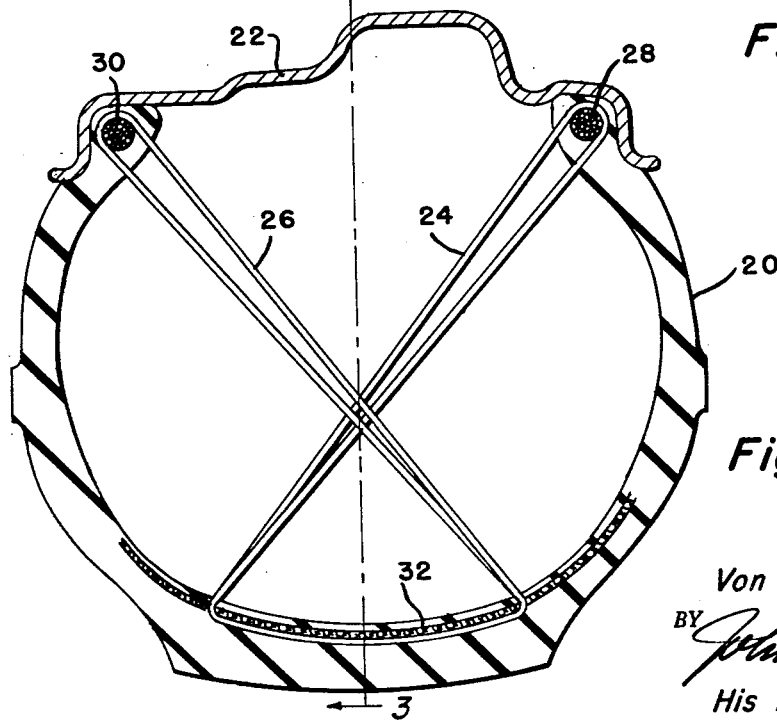

In the drawings:
FIGURE 1 is a plan view of a tire mounted on a rim.
FIGURE 2 is an enlarged section taken through line 2—2 of FIGURE 1 showing a cross section of the structure of the tire embodying the improvements claimed herein.
FIGURE 3 is a section taken on line 3—3 of FIGURE 2 showing the bracing from another view.
FIGURE 4 is a curve disclosing lateral spring rates wherein the lateral deflection in inches is plotted against the lateral force in pounds.

Pneumatic tires have been used for many years on motor vehicles wherein high pressures were provided and wherein the pneumatic medium was held within a tube. As time progressed, these tires became larger in cross section and the degree of inflation thereof was reduced to provide a softer, more comfortable ride within the vehicle by minimizing the transmission of road vibration, etc. In recent years, the so-called tubeless tire has been commercially accepted and this tire is of the low pressure type and, while minimizing some of the problems of low pressure tires due to the elimination of the tube, this tire, nevertheless, continues to present a problem in lateral flexibility when a soft ride is obtained. In other words, when the tire is inflated at low pressure, the vehicle tends to have considerable side sway due to lateral instability of the tire and, when the vehicle is changing directions, considerable side sway is experienced. This side sway creates an uncomfortable feeling for the occupants of the vehicle and, likewise, sets up strains within the tire which cause cords to sometimes break loose with eventual tire deterioration. Furthermore, this action creates increased temperatures within the tire during use which self-aggravates the condition.

The present invention eliminates many of these undesirable features of the present day tubeless, low pressure tire and yields considerable stability within the tire without in any way losing any of its desirable soft riding qualities.

The invention is specifically directed to cross bracing of the tire internally thereof to reduce side sway and lateral deflection thereof through the means of the criss-cross braces which reduces side movement of the tire in either direction while in no way hampering the softness of the ride through deflection of a portion of the tire with respect to its center.

Referring to the drawings, FIGURE 1 shows a standard pneumatic tire 20 mounted on a metal rim 22. FIGURE 2 is a cross section of the tire shown in FIGURE 1. FIGURE 3 is a section taken on line 3—3 of FIGURE 2 and FIGURE 4 is a set of curves plotting loads against lateral deflection.

In FIGURE 2, cross braces 24 and 26 are shown. It will be seen that these braces consist of a cord which is wrapped around the beads 28 and 30 or otherwise secured to the casing in the area of the beads used in the tire and which is preferably continuous and is anchored at the tread portion of the tire by means of one of the plies 32. In other words, the cord is built into the tire during the manufacture thereof and may be woven around the inner ply when it is used as an anchoring point. It is apparent that the supporting or reinforcing cord may pass beneath two, three or more plies which is a matter of choice but, in most instances, it is sufficient to anchor the cord reinforcement under the inner ply only. Also, other means may be used to anchor the cord if desired.

Referring to FIGURE 3, it will be noted that the reinforcement is continuous around the entire periphery of the tire and, in this respect, it is apparent that the cord need not be continuous but that a plurality of separate cord reinforcements may be used which are tied to the beads. However, for sake of clarity and ease of manufacture, a continuous cord is preferred. It is understood that only one ply in the tire is shown specifically at 32 and that other plies are present below and/or above the ply 32 as shown.

In general, the cords may be plastic, rayon, nylon, cotton, etc., impregnated with rubber, nylon, etc., or the cords may be metal such as a small woven type of cable. The beads are preferably metal such as woven cable or other conventional metal bead material and the tire may be made from natural rubber, butadiene copolymer rubber, polyurethane, butyl, etc., or compatible mixtures thereof as is well known in the art. The ply cords are preferably cotton, nylon, rayon or other synthetic material and supported in sheet form by means of the rubber-like material. All of the conventional portions of the tire form no part of this invention. In one method of making the tire, the first ply is laid on the mold and the cord or cords are then interlaced around the beads and over the ply. Subsequent plies are laid on in conventional manner and the built up tire is then vulcanized to integrate the plies, cords and beads. The cord used for the reinforcement may be latex-dipped to improve bonding thereof to the adjacent plies or the cord may be treated with a compatible and vulcanizable cement for the same purpose.

The increased stability of a tire using the present invention is clearly shown in FIGURE 4 wherein "A" shows the lateral deflection plotted against lateral force of the improved tire as disclosed herein. It will be seen that at 200 pounds, for example, of lateral force, a lateral deflection in the order of .024 inch is obtained whereas, on curve "B," which is a standard tire of identical size mounted on the same rim and tested under the same conditions, has a deflection of .116 inch or more than forty-eight times as much deflection. In each instance, a 1200 pound load was carried by the tire and, in each instance, the tires were inflated to 24 pounds pressure wherein the tires were 8.50 x 14 tires. This curve, therefore, demonstrates conclusively the tremendous improvement in lateral stability of the tire when using the present invention over conventional tires which do not include cross bracing.

The spacing of the cords may be used as a control for the degree of stabilization desired. The FIGURE 4 results were obtained with a spacing at the tread of about one-half inch between cords using a reinforcing cord of about one-eighth inch diameter. Greater spacing lessens the resistance to lateral movement and, for practical purposes, spacings greater than one inch are not recommended. Cord diameters of from 3/32" to 3/16" are preferred.

It is understood that the cross bracing must criss-cross in the tire so that one set of cords acts against the other to prevent side sway in either direction without in any way disturbing the softness of the ride.

While the embodiments of the present invention as herein disclosed constitute preferred forms, it is to be understood that other forms might be adopted.

What is claimed is as follows:

1. A pneumatic tire of the tubeless type, comprising, a tire casing including a pair of bead wires and a tread portion separated therefrom, a plurality of internal flexible braces positioned within the tire, said braces extending from adjacent the bead portion at one side of the tire in partially exposed cross-cross relation to adjacent the tread portion at the other side of the tire, said braces being disposed around the internal periphery of the tire and disposed so as to yield substantially equal resistance to lateral displacement of the tread relative to the bead portion thereof.

2. A pneumatic tire of the tubeless type, comprising, a tire casing including a pair of bead wires and a tread portion separated therefrom, a plurality of internal flexible braces positioned within the tire, said braces being partially exposed and disposed in alternate criss-cross relation and spaced equidistantly around the entire periphery of the tire for resisting lateral displacement of the tread relative to the bead portions thereof.

3. The pneumatic tire as claimed in claim 2 wherein the braces are cords vulcanized to the interior of the tire at one end thereof and secured to the beads at the other end thereof.

4. A pneumatic tire of the tubeless type comprising a casing having a plurality of plies of rubberized fabric therein and also including a pair of bead wires within the rim portion of the tire, the improvement comprising, transverse cross bracing built into the tire and consisting of criss-cross bracing cords extending from around the bead at one side beneath at least one ply at the tread portion and around the bead at the other side of the tire, said criss-cross bracing being at least partially exposed and extending around the entire periphery of the tire.

5. A pneumatic tire of the tubeless type comprising a casing having a plurality of plies of rubberized fabric therein and also including a pair of bead wires within the rim portion of the tire, the improvement comprising, transverse cross bracing built into the tire and consisting of bracing cords extending in exposed condition from the bead at one side of the tire to beneath at least one ply at the tread portion at the other side thereof whereby alternate bracings are criss-crossed in equally spaced relation around the entire periphery of the tire.

6. The pneumatic tire as claimed in claim 5 wherein the bracing consists of a single cord.

References Cited in the file of this patent

UNITED STATES PATENTS

| | | |
|---|---|---|
| 1,420,611 | Dickinson | June 29, 1922 |
| 1,496,164 | Morris | June 3, 1924 |
| 2,824,592 | Neisler et al. | Feb. 25, 1958 |
| 2,839,117 | Clayton | June 17, 1958 |